US009336312B2

(12) United States Patent
Sankar et al.

(10) Patent No.: US 9,336,312 B2
(45) Date of Patent: May 10, 2016

(54) VERTICAL-BASED QUERY OPTIONALIZING

(71) Applicants: Sriram Sankar, Palo Alto, CA (US); Igor Ribeiro de Assis, San Francisco, CA (US)

(72) Inventors: Sriram Sankar, Palo Alto, CA (US); Igor Ribeiro de Assis, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 309 days.

(21) Appl. No.: 13/858,775

(22) Filed: Apr. 8, 2013

(65) Prior Publication Data
US 2014/0304250 A1  Oct. 9, 2014

(51) Int. Cl.
*G06F 17/30* (2006.01)

(52) U.S. Cl.
CPC .... *G06F 17/30864* (2013.01); *G06F 17/30657* (2013.01)

(58) Field of Classification Search
CPC .................................................. G06F 17/30867
USPC ....................................................... 707/706
See application file for complete search history.

(56) References Cited

U.S. PATENT DOCUMENTS

| 7,558,787 | B2 * | 7/2009 | Parikh | |
|---|---|---|---|---|
| 8,005,825 | B1 | 8/2011 | Ghosh | |
| 2007/0038601 | A1 * | 2/2007 | Guha | 707/3 |
| 2007/0208724 | A1 | 9/2007 | Madhavan | |
| 2009/0125504 | A1 | 5/2009 | Adams | |
| 2010/0223250 | A1 | 9/2010 | Guha | |
| 2010/0250578 | A1 * | 9/2010 | Athsani et al. | 707/765 |
| 2010/0306213 | A1 * | 12/2010 | Taylor et al. | 707/759 |
| 2011/0022602 | A1 * | 1/2011 | Luo et al. | 707/748 |
| 2011/0040776 | A1 * | 2/2011 | Najm | G06F 17/30648 707/766 |
| 2012/0166925 | A1 * | 6/2012 | Boerries | G06Q 30/0251 715/205 |
| 2012/0296926 | A1 | 11/2012 | Kalin | |
| 2014/0280041 | A1 * | 9/2014 | Bosman et al. | 707/722 |

OTHER PUBLICATIONS

International Search Report and Written Opinion for International Application PCT/US2014/032780, Aug. 28, 2014.

\* cited by examiner

*Primary Examiner* — Etienne Leroux
*Assistant Examiner* — Cindy Nguyen
(74) *Attorney, Agent, or Firm* — Baker Botts L.L.P.

(57) ABSTRACT

In one embodiment, one or more computing devices receive a search query; the computing devices identify in the search query a search term associated with a first object type of multiple object types; the computing devices modify the search query by optionalizing the search term in the search query; the computing devices also send the search query as modified for execution against a first data store storing objects of the first object type.

20 Claims, 5 Drawing Sheets

US 9,336,312 B2

VERTICAL-BASED QUERY OPTIONALIZING

TECHNICAL FIELD

This disclosure generally relates to database.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

Particular embodiments describe methods for optimizing a search query by identifying a search term in the search query, and modifying the search query by optionalizing the search term. In particular embodiments, one or more computing devices may receive a search query, and identify in the search query a search term associated with a first object type of a plurality of object types. The computing devices may modify the search query by optionalizing the search term in the search query. The computing devices may send the search query as modified for execution against a first data storing objects of the first object type. The computing devices may also send the search query without the modification for execution against a second data store storing objects of a second object type of the object types, and aggregate first results from execution of the search query as modified with second search results from execution of the search query without the modification.

DESCRIPTION OF EXAMPLE EMBODIMENTS

Figure 1:
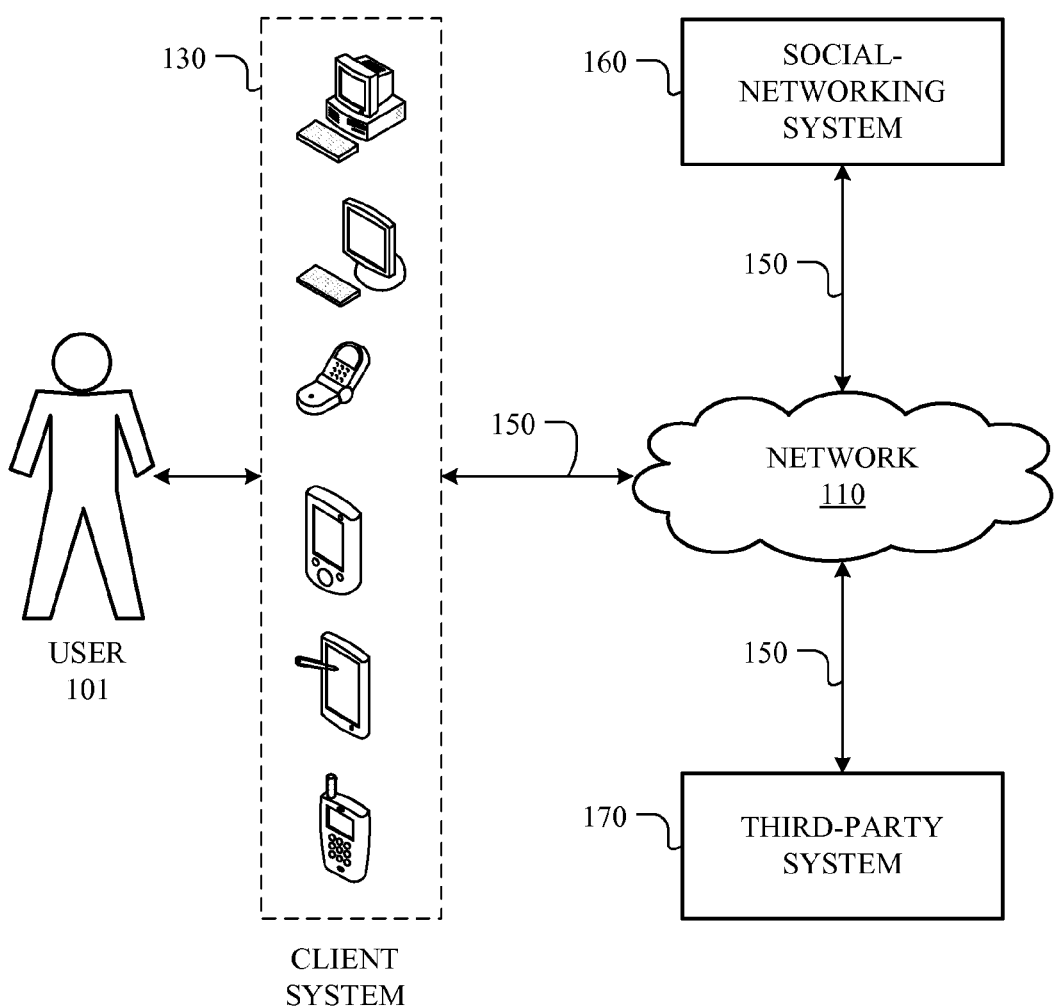
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 160 through blocking, data hashing, anonymization, or other suitable techniques as appropriate. In particular embodiments, third-party system 170 may be a network-addressable computing system that can host websites and applications. Third-party system 170 may generate, store, receive, and send third-party system data, such as, for example, web pages, text, images, video, audio, or applications. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
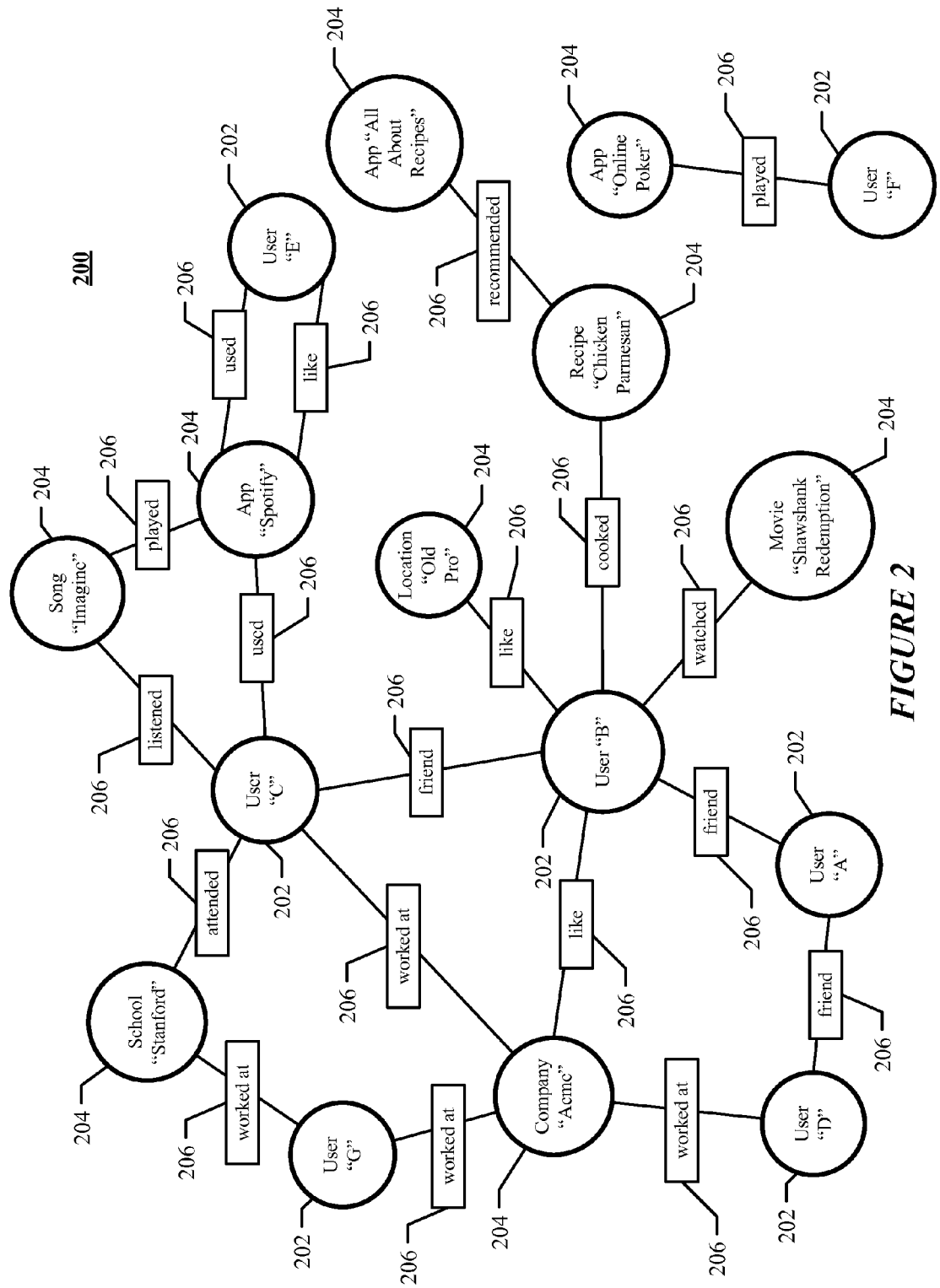
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In addition, the degree of separation between any two nodes is defined as the minimum number of hops (or edges) required to traverse the social graph from one node to the other. A degree of separation between two nodes can be considered a measure of relatedness between the users or the concepts represented by the two nodes in the social graph.

As described earlier, a social-networking system may store social-graph information and other social-networking system related information in one or more data stores. In particular embodiments, the information stored in the data stores may be organized according to specific data structures. Each data store may be a relational, columnar, correlation, or other suitable database. Particular embodiments contemplate any suitable types of database. Particular embodiments may provide interfaces that enable the social-networking system, a client system, or a third-party system to manage, retrieve, modify, add, or delete, the information stored in the data stores.

In addition, a database may be divided into a number of partitions. Each partition may be held by separate servers or at separate physical locations. As the index for each partition of a database is smaller than the index for the overall database, the partitioning may improve performance in accessing the database. As the partitions may be distributed over a large number of servers (while each partition may be duplicated at geographically diverse locations), the partitioning may also improve performance and reliability in accessing the database. A database may be partitioned by storing rows (or columns) of the database separately. A database may also be partitioned by using a hashing algorithm. A database may also be partitioned by some real-world segmentation of the data held by the database (e.g., customers in each time zone of the United States). Particular embodiments may partition storage of a collection of data based on object types. Particular embodiments may store data objects in a plurality of partitions, while each partition holding data objects of a single object type.

Figure 3:
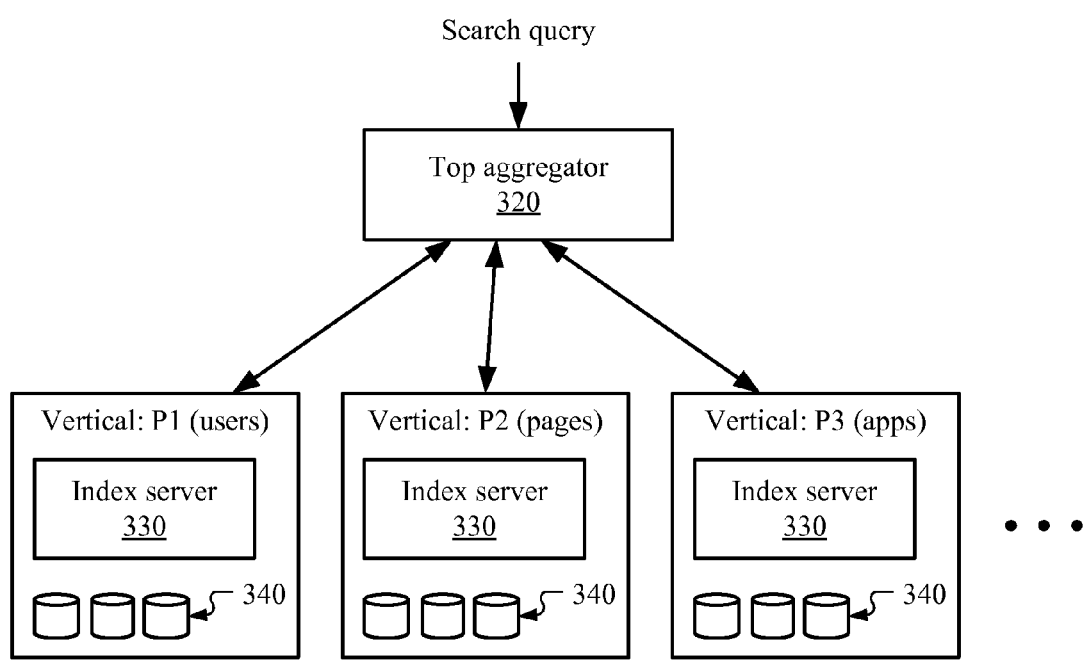
FIG. 3 illustrates an example partitioning for storing objects of a social-networking system.

FIG. 3 illustrates an example partitioning for storing objects of a social-networking system, or any suitable system storing a collection of data. In the examples of FIG. 3, a plurality of data stores or verticals (e.g., P1, P2, P3, and so on) may store objects of a social-networking system. In particular embodiments, each data store may be configured to store objects of a particular one of a plurality of object types in respective data storage devices 340. An object type may be user, web page, application, group, music, photo, video, post, news, question, comment, event, message, offer (e.g., coupon), and review. Particular embodiments contemplate any suitable object types for a social-networking system or any system storing a collection of data. For example, vertical P1 illustrated in FIG. 3 may store user objects; vertical P2 may store web page objects; vertical P3 may store application objects. That is, each data store may store objects of a single object type. In particular embodiments, objects stored in each data store or vertical may be indexed by a search index. The search index may be hosted by respective index server 330 comprising one or more computing devices (e.g., servers).

In particular embodiments, a server process hosted by one or more computing devices (e.g., servers of the social-networking system) may store objects in the verticals illustrated in FIG. 3. The server process may receive an object, and identify an object type of the received object. For example, the server process may receive an application uploaded to the social-networking system by a particular user, and identify an object type (e.g., application) of the application. The server process may assign an identifier (e.g., a character string) to the received application. In addition, the server process may determine information associated with the received object. For example, the server process may determine one or more users using the application, a comment about the application, or a location of the application. The server process may store the received object in at least a particular data store configured to store objects of the identified object type. For example, the server process may store the received application in the application vertical P3 illustrated in FIG. 3. The server process may store information associated with the received object in the particular data store. The server process may updated the search index of the particular data store based on at least in part on the received object.

In some embodiments, the received object (e.g., the received application) may correspond to a particular node of a social graph of the social-networking system. An edge connecting the particular node and another node may indicate a relationship between the received object and a user (or concept) corresponding to the other node. That is, the server process may store in the particular data store (of the identified object type) information of the received object, and information of one or more edges connecting a node corresponding to the received object in the social graph. The server process may update the search index of the data store based on the received object, and relationships (i.e., edges) associated with the received object.

A user or a computing process may submit a search query to a vertical illustrated in FIG. 3 for execution, causing the index server of the vertical to retrieve and return one or more search results for the search query. The index server may retrieve search results using the search query in its entirety. However, search results based on the entire search query may not be optimal. For example, a user may submit a search query "farmville app" to look for a game application named "farmville." If the entire search query "farmville app" is submitted to the application vertical P3 illustrated in FIG. 3, the index server of the application vertical P3 may not return matched results, as the application vertical P3 may only store application objects such as "farmville" or "farmville 2", but not an application object "farmville app." In comparison, if a search query "farmville" is submitted to the application vertical P3, the index server of the application vertical P3 may return matched results (e.g., applications "farmville" and "farmville 2"). That is, a search query may yield better search results if one or more terms in the search query is removed or made optional when the search query is submitted to a particular vertical. Particular embodiments describe methods for optimizing a search query by optionalizing a search term in the search query. Particular embodiments may identify in a search query a search term and its corresponding vertical, modify the search query by optionalizing the search term, and send the modified search query to the corresponding vertical for execution.

Figure 4:
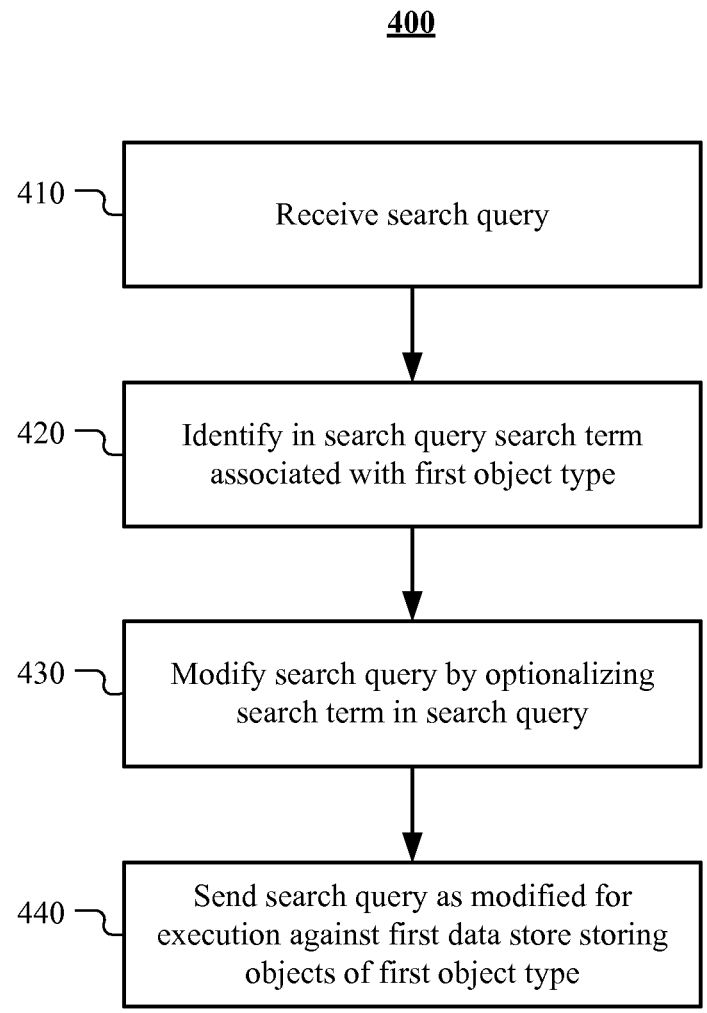
FIG. 4 illustrates an example method for optimizing a search query.

FIG. 4 illustrates an example method 400 for optimizing a search query. The method 400 may be implemented by an aggregator process (e.g., top aggregator 320 illustrated in FIG. 3) hosted by one or more computing devices (e.g., servers) of the social-networking system, or any suitable system comprising one or more database. The method may begin at step 410. In particular embodiments, at step 410, the aggregator process may receive a search query. For example, the aggregator process may receive a search query as illustrated in FIG. 3. The search query may comprise a text string. The search query may be a structured or substantially unstructured text string submitted by a user via a PHP process (or another process of the social-networking system). The search query may be a text string such as "farmville app", "becks company", "lake tahoe", or "the US President."

In particular embodiments, the social-networking system may specify one or more search terms that may be made optional in a search query submitted to a particular vertical for execution. For example, the social-networking system may specify search terms "app", "application", and "game" that may be made optional in a search query submitted to the application vertical P3. The social-networking system may specify search terms "page", "pages", "company", "about", and "com" that may be made optional in a search query submitted to the page vertical P2. The social-networking system may specify search terms "friend" and "person" that may be made optional in a search query submitted to the user vertical P1. The social-networking system may also specify search terms "group" and "groups" that may be made optional in a search query submitted to a data store storing objects of a group object type. In particular embodiments, at step 420, the aggregator process may identify in the search query a search term associated with a first object type of a plurality of object types. That is, the aggregator process may identify in the search query a search term corresponding to a particular vertical storing objects of the first object type. The search term may be made optional in a search query submitted to the particular vertical for execution.

In particular embodiments, at step 430, the aggregator process may modify the search query by optionalizing the search term in the search query. The aggregator process may optionalize the search term by removing the search term from the search query. For example, the aggregator process may identify in a search query "farmville app" a search term "app" that is associated with an application object type. The aggregator process may optionalize the search term "app" by removing the search term from the search query. That is, the aggregator process may modify the search query as "farmville." For another example, the aggregator process may receive a search query "becks company" (e.g., from a user looking for a company named "Beck" or "Beck's"). The aggregator process may identify in the search query "becks company" a search term "company" that is associated with a web page object type. The aggregator process may optionalize the search term "company" by removing the search term from the search query. That is, the aggregator process may modify the search query as "becks." In one embodiment, the aggregator process may remove from a search query one or more stop words such as "a", "an", or "the." For example, the aggregator process may remove "the" from a search query "the US President."

In other embodiments, the aggregator process may optionalize the search term by assigning a value to the search term in the search query. The search query as modified may require, from execution of the search query as modified, a ratio of results matching the search term to all results exceeding the value. For example, the aggregator process may assign a value of 0.2 to the search term "app" in the search query "farmville app." The aggregator process may modify the search query as "farmville app 0.2." The modified search query "farmville app 0.2" may requires that 20% (i.e., 0.2) of search results must match the search term "app", while the remaining 80% of the search results may omit that search term. That is, if there are 100 search results of the modified search query "farmville app 0.2", then 20 results must match the search term "app", while 80 results may match only the rest of the search query (i.e., "farmville"). For another example, the aggregator process may receive a search query "lake tahoe." The aggregator process may identify in the search query "lake tahoe" a search term "lake" that is associated a web page object type. The aggregator process may assign a value of 0.4 to the search term "lake" in the search query "lake tahoe." The modified search query "lake 0.4 tahoe" may requires that 40% of the search results must match the search term "lake", while the remaining 60% of the search results may omit that search term. That is, if there are 100 search results of the modified search query "lake 0.4 tahoe", then 40 results must match the search term "lake", while 60 results may match only the rest of the search query (i.e., "tahoe").

In particular embodiments, at step 440, the aggregator process may send the search query as modified for execution against a first data store storing objects of the first object type. That is, the aggregator process may send the search query as modified for execution against the vertical corresponding to the identified search term. For example, for the search query "farmville app" with the identified search term "app" that is associated with the application object type, the aggregator process may send the modified search query "farmville" (or "farmville app 0.2") to the application vertical P3 illustrated in FIG. 3. As described earlier, the modified search query may yield better search results, as it is more likely that the application vertical P3 store application objects with names comprising "farmville", while it is less likely that the application vertical P3 store application objects with names "farmville app." For another example, for the search query "becks company" with the identified search term "company" that is associated with the web page object type, the aggregator process may send the modified search query "becks" to the page vertical P2 illustrated in FIG. 3. For another example, for the search query "lake tahoe" with the identified search term "lake" that is associated with the web page object type, the aggregator process may send the modified search query "lake 0.4 tahoe" to the page vertical P2 illustrated in FIG. 3.

In addition to sending the search query as modified for execution against the first data store storing objects of the first object type, in particular embodiments, the aggregator process may send the search query without the modification for execution against a second data store storing objects of a second object type of the object types. That is, in addition to sending the search query as modified to a data store storing objects of the (identified) first object type, the aggregator process may send the search query without the modification to other data stores each storing objects of an object type different from the first object type. For example, the aggregator process may send the unmodified search query "farmville app" to the users vertical P1 or to the page vertical P2 illustrated in FIG. 3. For another example, the aggregator process may send the unmodified search query "becks company" to the user vertical P1 or to the application vertical P3 illustrated in FIG. 3. The aggregator process may send the unmodified search query "lake tahoe" to the user vertical P1 or to the application vertical P3 illustrated in FIG. 3.

In particular embodiments, the aggregator process may aggregate first results from execution of the search query as modified with second search results from execution of the search query without the modification. For example, for the search query "farmville app" described above, the aggregator process man aggregate a first list of search results retrieved from the application vertical P3 (based on the modified search query "farmville" or "farmville app 0.2") and a second list of search results retrieved from the user vertical P1 and the page vertical P2 (based on the unmodified search query "farmville app"). The aggregator process may aggregate the first and second list of search results by applying an OR operator to the first and second list of search results. That is, the aggregated results are a union of the search results in the first and the second lists. In addition, in particular embodiments, the aggregator process may rank the aggregated results based at least in part on the first search results. For example, the aggregator process may rank the first search results (e.g., retrieved from the application vertical P3 based on the modified search query "farmville" or "farmville app 0.2") higher than the second search results (e.g., retrieved from the user vertical P1 and the page vertical P2 based on the unmodified search query "farmville app").

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
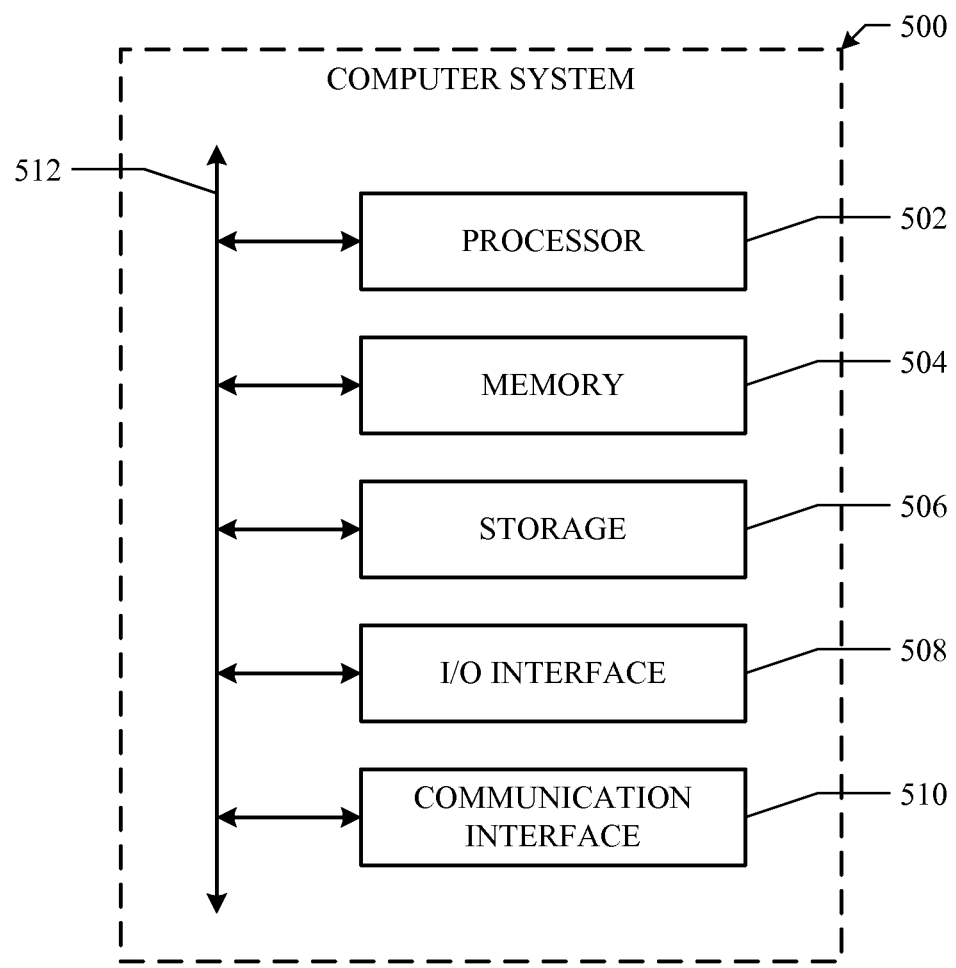
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by one or more computing devices, receiving a search query comprising a plurality of search terms;

by one or more computing devices, identifying in the search query a first search term of the plurality of search terms, wherein the first search term is determined to be associated with a first object type of a plurality of object types;

by one or more computing devices, modifying the search query by optionalizing the first search term in the search query, the optionalizing being based on the first search term being determined to be associated with the first object type, wherein the optionalizing comprises requiring, from execution of the search query as modified, a particular ratio of results matching the first search term to all results; and by one or more computing devices, sending the search query as modified for execution against a first data store from a plurality of data stores, the first data store storing objects of the first object type.

2. The method of claim 1 wherein the particular ratio is zero.

3. The method of claim 1, further comprising, by one or more computing devices:

sending the search query without the modification for execution against a second data store storing objects of a second object type of the object types; and aggregating first search results from execution of the search query as modified with second search results from execution of the search query without the modification.

4. The method of claim 3, further comprising by one or more computing devices, ranking the search results as aggregated based at least in part on the first search results.

5. The method of claim 1, wherein modifying the search query by optionalizing the first search term comprises removing the first search term from the search query.

6. The method of claim 1, wherein modifying the search query by optionalizing the search term comprises assigning a value to the search term in the search query, the search query as modified requiring, from execution of the search query as modified, the particular ratio to correspond to the assigned value.

7. The method of claim 1, wherein the first object type is user, web page, application, or group.

8. The method of claim 1, wherein the one or more computing devices and the plurality of data stores are associated with a social-networking system.

9. One or more computer-readable non-transitory storage media embodying software that is operable when executed to:

receive a search query comprising a plurality of search terms;

identify in the search query a first search term of the plurality of search terms, wherein the first search term is determined to be associated with a first object type of a plurality of object types;

modify the search query by optionalizing the first search term in the search query, the optionalizing being based on the first search term being determined to be associated with the first object type, wherein the optionalizing comprises requiring, from execution of the search query as modified, a particular ratio of results matching the first search term to all results; and send the search query as modified for execution against a first data store from a plurality of data stores, the first data store storing objects of the first object type.

10. The media of claim 9, wherein the software is further operable when executed to:

send the search query without the modification for execution against a second data store storing objects of a second object type of the object types; and aggregate first search results from execution of the search query as modified with second search results from execution of the search query without the modification.

11. The media of claim 10, wherein the software is further operable when executed to rank the search results as aggregated based at least in part on the first search results.

12. The media of claim 9, wherein to modify the search query by optionalizing the first search term, the software is operable when executed to remove the first search term from the search query.

13. The media of claim 9, wherein to modify the search query by optionalizing the search term, the software is operable when executed to assign a value to the search term in the search query, the search query as modified requiring, from execution of the search query as modified, the particular ratio to correspond to the assigned value.

14. The media of claim 9, wherein the first object type is user, web page, application, or group.

15. The media of claim 9, wherein the computer-readable non-transitory storage media and the plurality of data stores are associated with a social-networking system.

16. A system comprising: one or more processors; and a memory coupled to the one or more processors comprising instructions executable by the one or more processors, the one or more processors being operable when executing the instructions to:

receive a search query comprising a plurality of search terms;

identify in the search query a first search term of the plurality of search terms, wherein the first search term is determined to be associated with a first object type of a plurality of object types;

modify the search query by optionalizing the first search term in the search query, the optionalizing being based on the first search term being determined to be associated with the first object type, wherein the optionalizing comprises requiring, from execution of the search query as modified, a particular ratio of results matching the first search term to all results; and send the search query as modified for execution against a first data store from a plurality of data stores, the first data store storing objects of the first object type.

17. The system of claim 16, wherein the one or more processors are further operable when executing the instructions to:

send the search query without the modification for execution against a second data store storing objects of a second object type of the object types; and aggregate first search results from execution of the search query as modified with second search results from execution of the search query without the modification.

18. The system of claim 17, wherein the one or more processors are further operable when executing the instructions to rank the search results as aggregated based at least in part on the first search results.

19. The system of claim 16, wherein to modify the search query by optionalizing the first search term, the one or more processors are operable when executing the instructions to remove the first search term from the search query.

20. The system of claim 16, wherein to modify the search query by optionalizing the search term, the processors are operable when executing the instructions to assign a value to the search term in the search query, the search query as modified requiring, from execution of the search query as modified, the particular ratio to correspond to the assigned value.

* * * * *